May 16, 1933.  A. FARRELL  1,908,743

RESILIENT MOUNTING FOR BEARINGS

Filed Nov. 30, 1929

INVENTOR.
Asa Farrell
BY Harry C. Schroeder
ATTORNEY

Patented May 16, 1933

1,908,743

UNITED STATES PATENT OFFICE

ASA FARRELL, OF OAKLAND, CALIFORNIA

RESILIENT MOUNTING FOR BEARINGS

Application filed November 30, 1929. Serial No. 410,736.

The invention is a resilient mounting for bearings, specifically adapted to that type of bearing which is ordinarily subject to shock, as applied to centrifugal pumps, blowers and similar mechanisms.

The object of the invention is to provide a resilient means for mounting bearings, particularly roller and ball bearings, whereby shock is absorbed, partly or in full, by a resilient member.

Another object of the invention is to provide a resiliently mounted bearing which will permit slight misalignment, and compensate for deflections or changes in alignment due to suddenly increased torque or shocks transmitted through or to the revolving mechanism.

Other objects of the invention will become apparent as the nature of the invention is better understood, as the description is set forth, and by reference to the appended claims.

In the accompanying drawing, and in the following description similar reference characters will in all cases have reference to similar parts throughout the several views and description.

Referring to the drawing.

Figure 2:
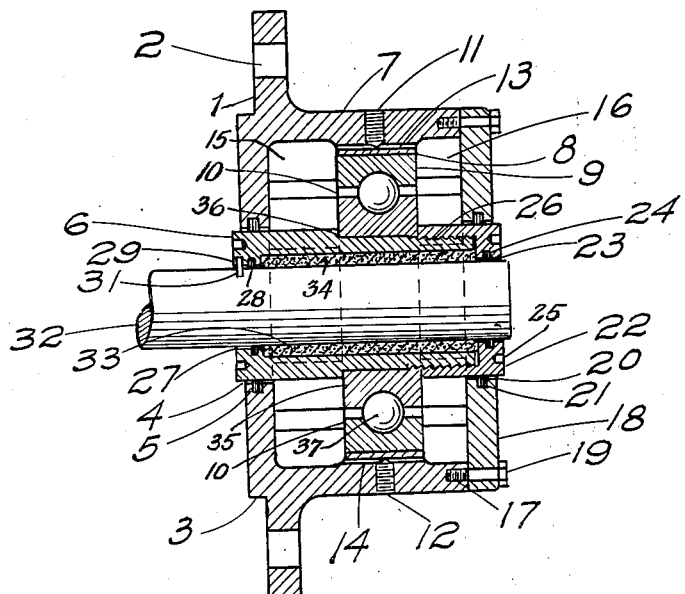
Fig. 2 is a longitudinal section taken through the vertical center of Fig. 1.
Figure 1:
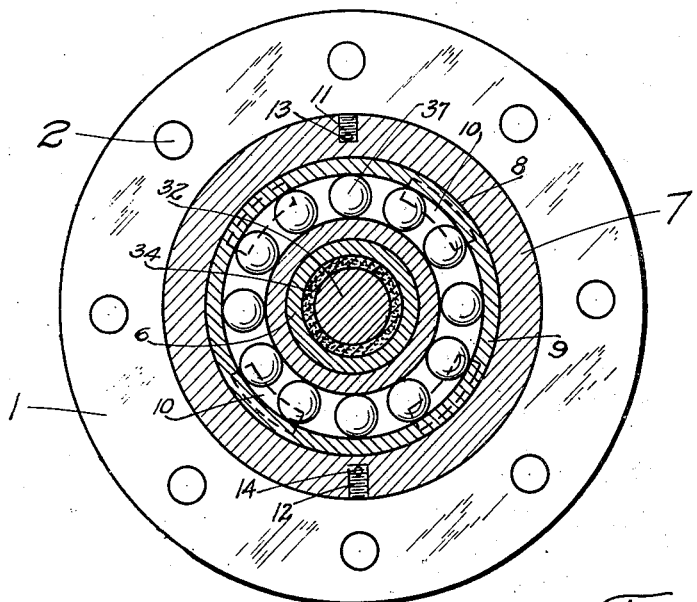
Fig. 1 is a sectional end elevation through the invention, as applied to a radial type of ball bearing, showing all cooperating members.

The housing or cage comprises a flange 1, adapted to be bolted in position through bolt holes 2 and centered by means of a circular projection 3, fitting into a bore or recess in the operated device, not shown. An aperture 4 is provided, having a circular recess 5 formed therein, said aperture 4 providing clearance over and admitting a sleeve 6. The housing 7 projects outwardly from flange 1 and is provided with a bore 8 to receive an outer ball or roller race 9 and shoulders 10 to determine the longitudinal position of the race 9. Threaded apertures are provided at 11 and 12 having ducts 13 and 14 communicating with oil chambers 15 and 16. The outer end of housing 7 is adapted to have a cover plate 18 attached thereto, as indicated at 17.

Cover plate 18 is adapted to be attached to housing 7 as indicated at 19, and has a centrally disposed aperture 20, recessed as indicated at 21, said aperture providing clearance over the internally threaded thrust and retaining member 22. Outer race 9 is preferably pressed into position in bore 8 to prevent rotation of race 9 within the bore 8. Lubricant delivered through aperture 11 passes through duct 13 to chambers 15 and 16, and may be drained through duct 14 and aperture 12.

Thrust and retaining member 22 is provided with a centrally disposed aperture 23, recessed as indicated at 24, and adjusting means 25 comprising holes for cooperating with a spanner type of wrench. Member 22 is internally threaded, as indicated at 26, to cooperate with externally threaded portion of sleeve 6.

Sleeve 6 is provided with a clearance aperture 27, recessed as indicated at 28, and provided with a keyway 29 for cooperation with a pin 31, said pin 31 being fixed in shaft 32. A counterbore 33 is provided in sleeve 6 for reception of a cylinder of soft rubber 34 or other resilient material, and is preferably vulcanized or cemented in place. The centrally disposed bore of cylinder 34 provides a compressible fit on shaft 32. Inner race 35 is forced against the shoulder 36 of sleeve 6 and retained in position by member 22. Oil retainers are provided in recesses 5, 28, 21 and 24, balls or rollers 37 completing the assembly.

In operation, shaft 32 having an impeller, rotor or other member integral therewith, is caused to rotate. Shaft 32 being resiliently mounted in the resilient cylinder 34, said resilient cylinder 34 is retained by sleeve 6, which is keyed to shaft 32 by means of pin 31. Inner race 35 is retained on sleeve 6 by means of internally threaded retaining member 22, causing the aforenamed members to rotate together in unison. Stationary members include the outer race 9, cover plate 18 and housing 7. Shocks produced in or transmitted through shaft 32 are absorbed by the cushioning effect of resilient cylinder 34, thereby preventing shock to housing 7, balls 37, inner race 35 or outer race 9. Similarly, misalignment would be compensated for by the resiliency of cylinder 9.

It will be noted that I do not limit the invention to the exact arrangement of parts as indicated in the drawing or as described, different conditions or mechanisms requiring individual consideration in arrangement, and material, and that such variation in arrangement may be resorted to without departing from the spirit or scope of the invention or sacrificing any of the advantages thereof.

I claim:

1. In combination with a shaft, a sleeve having a concentric bore and a counterbore extending the major portion of the length thereof, said bore freely clearing said shaft, the space between said counterbore and said shaft being compressibly filled with resilient material, said sleeve being fixed to rotate with said shaft, an external thread at the end opposite said bore and an inwardly flanged nut element cooperating therewith, and having a bore freely clearing the adjacent portion of said shaft.

2. In combination with a rotating element, a rigid sleeve concentrically mounted on said rotating element and a resilient material compressibly filling the space between said sleeve and said rotating element, said sleeve being fixed to rotate with said rotating element, an external circumferential shoulder on said sleeve, and a clamp element cooperating with said sleeve and adapted to retain a bearing element against said shoulder and having a bore freely clearing said rotating element.

3. In combination with a rotating element, a rigid sleeve having a bore of greater diameter than said rotating element, and a concentric counterbore having a sleeve of resilient material mounted therein and cooperating with said rotating element, said sleeves being fixed to rotate with said rotating element, a circumferential shoulder formed intermediately on said rigid sleeve, an external thread at one end of said rigid sleeve, a clamp nut coperating with said thread and adapted to clamp the inner race of a ball bearing against said shoulder, said clamp nut having a bore freely clearing said rotating element, and oil excluding means formed within said bores.

4. A resilient bearing mounting comprising a tubular element having one end inwardly flanged and an external thread at the other end, a nut having an inwardly extending flange and cooperating with said external thread, said flanges each having a groove formed therein, and an oil excluding resilient packing in said groove, said tubular element having a sleeve of resilient material affixed therein and adapted to compressibly fit a rotating member, a pin fixed in said rotating member, the flange on said tubular element having a keyway cooperating with said pin, and a circumferential shoulder on said sleeve in cooperative relation to said nut adapted to clamp the inner race of a ball bearing, intermediately disposed on said tubular element.

5. A resilient bearing mounting, in combination with a radial ball bearing and a shaft, a tubular member having a bore freely clearing said shaft and keyed to prevent rotation thereon, a counterbore formed in said tubular member, a resilient material in said counterbore compressibly cooperating with said shaft, an external thread on said tubular member at the end opposite said bore, a nut cooperating with said thread and having a bore freely clearing said shaft, an annular groove or recess in each of said bores, said grooves having a resilient oil excluding packing therein and cooperating with said shaft, the inner race of said ball bearing being mounted on said tubular member, and a shoulder on said tubular member adapted to cooperate with said nut for retaining said race against axial movement, and a rigid support for the outer race of said ball bearing.

In testimony whereof I have affixed my signature.

ASA FARRELL.